July 19, 1966  TADASHI SAITO ETAL  3,261,192
METHOD AND APPARATUS FOR MANUFACTURE OF TOOTHED WHEEL
Filed March 17, 1964  3 Sheets-Sheet 1

United States Patent Office 3,261,192
Patented July 19, 1966

3,261,192
METHOD AND APPARATUS FOR MANUFACTURE OF TOOTHED WHEEL
Tadashi Saito, 333—31 Aza Koshinzuka, Isoshi, Takarazuka, Japan, and Masaya Saito, 23—13 Aza Hiratsuka, Obayashi, Takarazuka, Japan
Filed Mar. 17, 1964, Ser. No. 352,455
4 Claims. (Cl. 72—87)

This invention relates to a method and apparatus for the manufacture of toothed wheels.

According to the conventional method of producing a toothed wheel, a blank of material is prepared enough to conform roughly to the design of the toothed wheel and the designed shape is finally attained by means of careful grinding. The "blank" may be, for example, a steel ingot. The surface of the blank is heated by high frequency electric waves or a blaze of gas, then this blank is rotated while engaging the master gear. Therefore, the red heated part of this blank is pressed by the teeth of the master gear whereby, in effect, the blank is in gear with the master gear. In this meshing or gearing the excess material which is pushed out from the material by the force of the gearing is crammed into the space between the tooth profile of master gear. This is continued until the formation of a tooth profile in the blank is completed. Therefore the diameter of the pitch circle of the toothed wheel thereby produced becomes small in accordance with the successive meshing of the material with the master gear. Thus, the occurrence of variation in the diameter of pitch circle can not be avoided. If the said motion is so designed as to allow the pitch to correspond to the designed number of teeth, an excess portion of teeth which must be struck off or crushed up will develop during this operation. These shortcomings diminish the utility and efficiency of the prior art method for producing a toothed wheel.

The object of this invention is to produce a toothed wheel which coincides with the designed dimension precisely and is excellent in quality, on an industrial scale and economically.

The feature of this invention concerning the method for producing a toothed wheel is as follows:

A plurality of master gears are arranged with their axes on a circumference of the common circle in a rotatable condition. A red heated blank, which is received in the circumference of a circle defined by the outer profile of the master gears, is compressed with or without rolling by means of a press or rolls. Then the outer part of material which under the pressure is expanding outwardly is crammed into the spaces between the teeth profile of the master gears, one after another. In this case, the master gears are driven to rotate or the said rolling material is driven to rotate. By means of this operation, which is continued until the profile of the teeth of the toothed wheel as designed is formed, a toothed wheel is produced.

The feature of this invention concerning the apparatus for producing a toothed wheel is as follows:

The apparatus of said invention consists of a number of elements, that is, master gears which are rotatably arranged with their axes on the circumference of a common circle, being arbitrarily spaced from each other, a part of a receptacle which keeps the red heated material into the circumference of the circle defined by the outer profile of these master gears, a rolling device for red heated material, etc. By means of the rotation of the master gears or by rolling of the red heated blank with the rotation which is carried out in the circumference of circle defined by the outer profile of said master gears, the material of the blank expanding outwardly is crammed into the space between the profile of teeth of said master gears, then the profile of teeth of designed toothed wheel is developed.

By the method of this invention, the diameter of the pitch circle of the toothed wheel is kept constant during the operation of manufacturing. The reason of the said feature is due to the fact that the material, a bar or lump of steel which has not been ground, is heated and is rolled by means of a press or roller within the circumference of the circle defined by the outer profile of the rotating master gears and the expanding part of said material is crammed into the space between the teeth of said master gears and then the said material is formed into a toothed wheel.

The circle inscribing to the outer profile of the master gears is fixed, therefore it causes the diameter of the pitch circle and the diameter of the addendum circle of the toothed wheel to be constant. According to the fact that there is no unreasonable procedure in the formation of the toothed profile, the toothed wheel possesses no defects such as scratches, fatigue, deformation, etc. Moreover, since the material is continuously rolled and allowed to expand while being worked upon the quality of the resultant product is excellent and this product has a uniform fibrous structure with markedly improved stiffness and durability and other good properties, and the time and costs for producing are reduced remarkably. Thus, this invention allows the economical method for producing toothed wheel in industrial scale.

This invention is explained in detail by the accompanying drawings, wherein.

Figure 2:
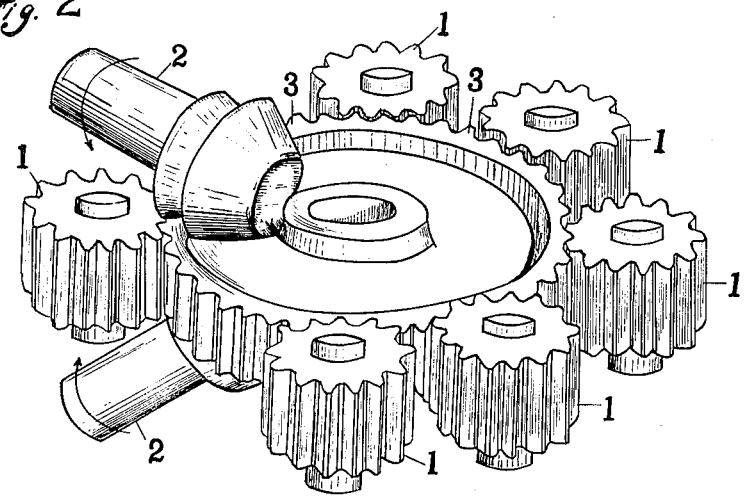
FIG. 2 is a partial view, in perspective of an apparatus of this invention in an almost final phase of manufacturing to produce a toothed wheel of large size.
Figure 1:
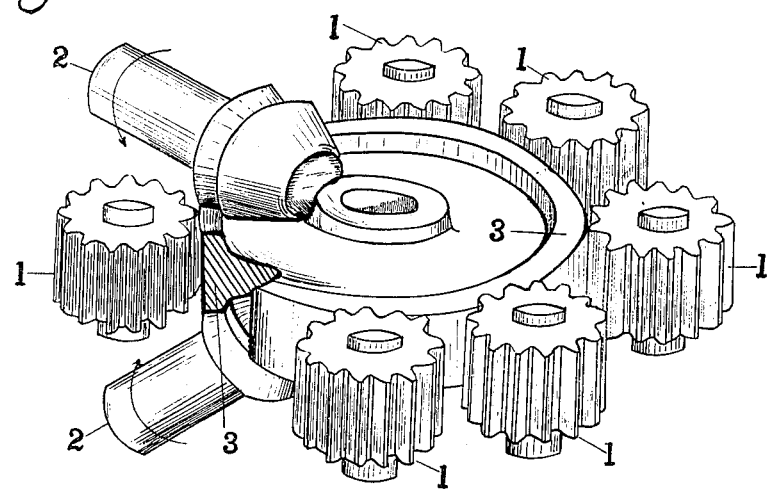
FIG. 1 is a partial view, in perspective, of an apparatus of this invention in an initial phase of manufacturing to produce a toothed wheel of large size.
Figure 7B:
FIG. 7 (a), (b), (c), (d), and (e) illustrate the order of forming the profile of teeth in the operation to produce a toothed wheel by the method of this invention.
Figure 7C:
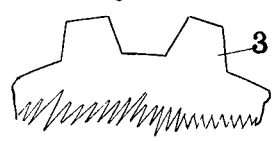

Referring to FIG. 1 and FIG. 2 wherein a method utilizing rolls is shown. The master gears 1 serve as the matrix for a toothed wheel to be produced, a toothed wheel is produced from a material 3 meshing with the teeth of the matrix. A large number of such master gears are rotatably arranged with their axes on the circumference of a common circle. The red heated material 3 which is heated to the forging temperature is received in the space formed by the outer profile of these master gears, constituting in effect, a receptacle, and, when this red heated material 3 is rolled by upper and lower rolls 2, 2, then the material 3 is pressed and expands outwardly, so that the outer edge comes into contact with the master gears 1 and is gradually crammed into the space between teeth of the master gears while the material is being is rotation. This rotation of the material 3 causes the rotation of each master gear 1 around their own axis. The rolling and rotation of material 3 and the rotation of master gear 1 are continued until a correct profile of tooth of designed toothed wheel is produced.

Figure 3:
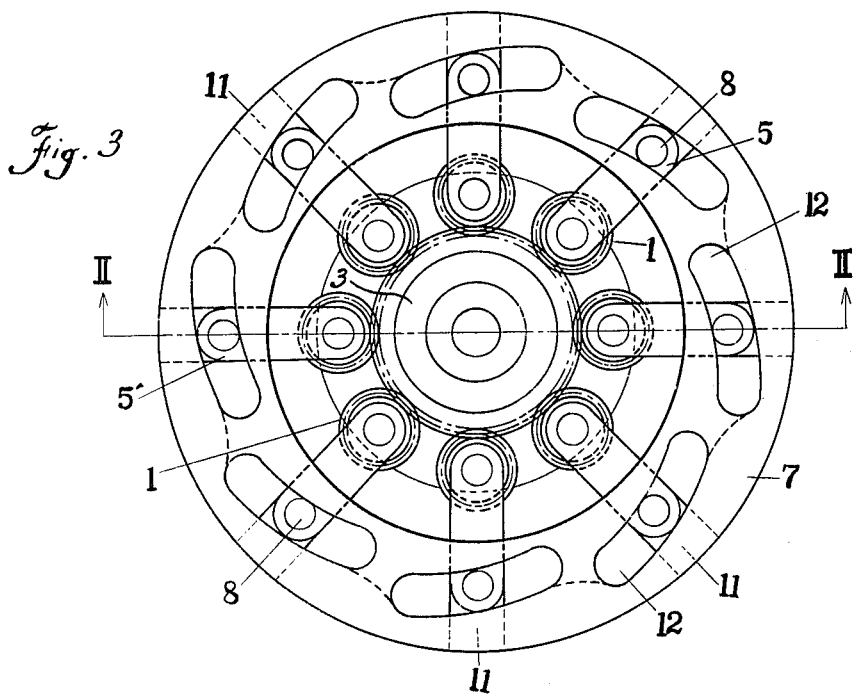
FIG. 3 is an elevation of an appartus manufacturing a toothed wheel of small size according to this invention.
Figure 4:
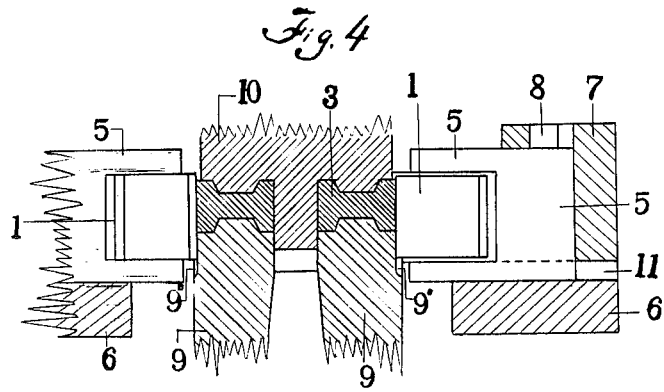
FIG. 4 shows a partial sectional view taken along the line II—II of FIG. 3.
Figure 7A:
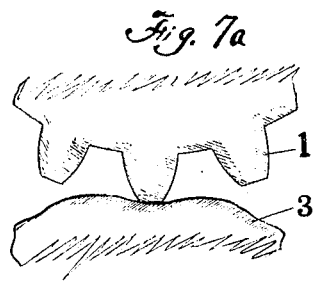

Referring to FIG. 3 and FIG. 4 showing the method of manufacturing to produce a toothed wheel by utilizing a press, bearing stand 5 having master gears 1 which are mounted on it for rotation about their axes, are arranged adjustably on a frame 7 on the circumference of a common circle. The bearing stands 5 have pins 8 at the rear part thereof. The pins 8 are fitted in skewed grooves provided in the frame 7, so that by rotating the frame 7 relatively to a fixed frame 6 all master gears 1 may be simultaneously and equally turned for opening and closing, thereby allowing the insertion of material and taking off the product and adjustment of setting, etc. The grooves 11 are provided in the fixed frame 6. The bearing stands 5 are fitted at their lower ends in the grooves 11 and are possible to move therein back and forth, not right and left.

The frame 7 and the fixed frame 6 are built in the press and adapted to be rotated by a rotating mechanism. This part is not shown in this figure.

Within the frame 7 and the fixed frame 6, a lower mold 9 is mounted. This lower mold 9 meshes with the lower part of each master gear 1 and is impossible to move. Placing the material 3 on the lower mold 9, the press is operated to push down an upper mold 10. This press is specially designed to be adapted for this invention, the essential parts thereof being adapted to receive the frames 6 and 7, though be not shown in any drawings of this application, allow the adjustment of press-speed freely.

The master gears 1 are so adjusted as to getting a proper dimension of designed toothed wheel, having some allowance to thermal contraction and errors in machine making.

By means of the meshing of the guide teeth 9' of the lower mold 9 with the master gears 1, the material 3 is inserted into this apparatus and then the press is driven to push down the upper mold 10 while rotating the frame 6 and 7. Providing the motion of this pushing down operation is operated rather slowly, the material 3 is squeezed so that the outer diameter thereof is increased, then the outer edge thereof becomes to contact with the master gears 1. The further pushing down operation of the upper mold 10 causes the growth of cramming of the outer edge of this material 3 with the master gears, and since the master gears 1 are rotated with a correct pitch around their own axis as well as around the axis of the material 3, the expanding outer edge of this material 3 is taking the form of toothed shape successively in order of the prcess (a), (b), (c), (d), and (e) of FIG. 7. Since the toothed part of material is formed by means of expansion growing from the interior thereof, the fibers have an ideal structure as shown in the drawing (e) of FIG. 7. The outer skin portion of tooth of material 3 is not subjected to immoderate cramming, expanding, beating caused by the error in pitch, scriping, deforming, etc., as in a conventional rolling operation of manufacturing of toothed wheel. Further, it is unnecessary to modify by the finishing operation and excessive working caused by insufficient expending, complete formation of toothed wheel can be performed in a short period of time.

Figure 6:
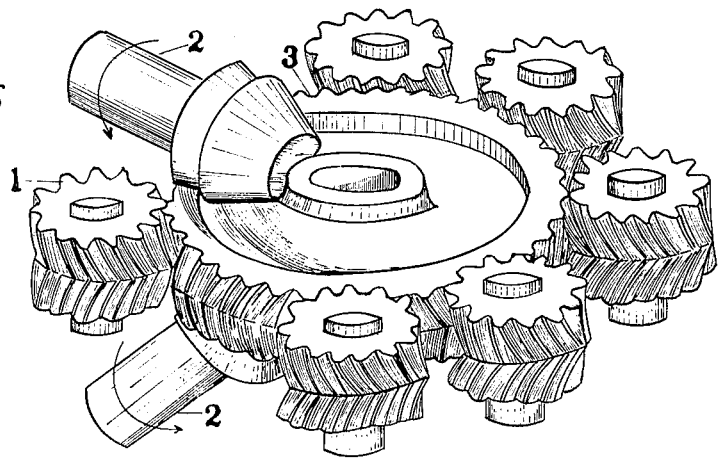
FIG. 6 is a partial view, in perspective, showing an almost final phase of manufacturing to produce a double helical gear.
Figure 5:
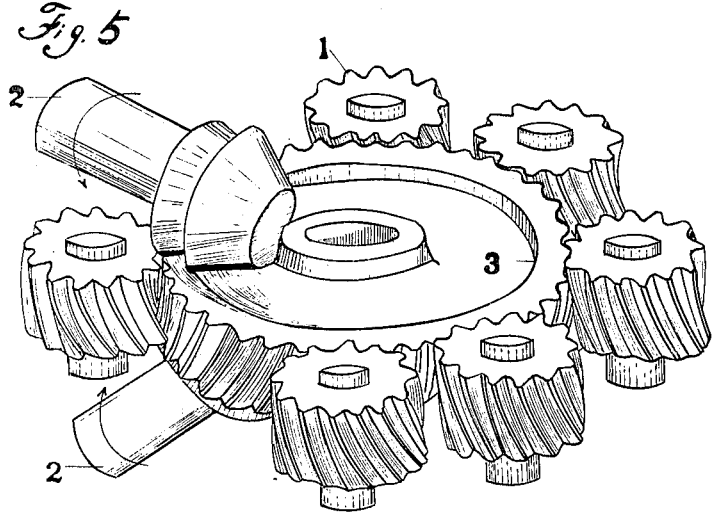
FIG. 5 is a partial view, in perspective, showing an almost final phase of manufacturing a helical gear.
Figure 7D:
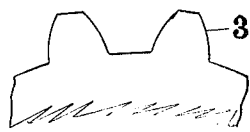
Figure 7E:
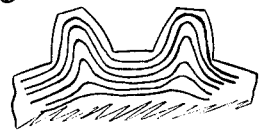

As shown in FIG. 5 and FIG. 6, a helical gear or double helical gear may also be produced by using the master gears in the form of helical gear or double helical gears, alternatively.

The shape of material to use for his invention is that of bar or lump. This material of steel is heated to so-called forging temperature ranging from 1100° C. to 1350° C., depending upon the classes of quality of steel. This red heated material is pressed to provide a merely gear shaped block, then this gear shaped block is operated by the process of this invention without being reheated.

The scale being produced during this operation is continuously removed by means of water or stream, etc. under pressure, so that the tooth skin of this product is maintained fine and smooth.

The master gears to use for this invention correspond to each other in diameter, number of teeth and in tooth profile. The material using for the conventional process of gear rolling were required to be precise in dimension, but on the contrary, in the method of this invention the variation of volume of the material does not induce any trouble since such variation is compensated by the thickness of material. Thus the operation to produce a toothed wheel can be performed quickly and easily.

Even if partially of material and eccentricity occur in the material 3, this does not matter since the leveling action takes place. This leveling action is caused by the action of master gears annularly arranged around the material. By this leveling action, excessive materials are supplied to thinner portion of the material 3. Thus uniform and excellent quality of toothed wheel can be produced.

Since the master gears are annularly arranged, the accuracy of the product is assured in respect of circularity and pitch diameter. It is possible to adjust finely the diameter of the circle which is inscribed to the outer profile of master gears, and thereby to assure the precise dimension of products.

The products obtained by the method according to this invention possess a uniform fibrous structure shown in the drawing (e) of FIG. 7, so that their strength and durability can be improved greatly.

Various changes and modifications may be made in the practice of the present invention without departing from the principle thereof, by adding customary practice and established knowledge of the art to the present disclosure and the scope of the appended claims is not to be regarded as limited except as specified therein.

What we claim is:

1. A method of producing a toothed wheel comprising receiving a blank of material within the circumference of a circle defined by the outer periphery of a plurality of master gears, said blank having sides, a top face and a bottom face, engaging the sides of the blank with the master gears subjecting the top and bottom faces of the blank to rolling compressive forces while providing relative rotational motion between the master gears and the blank until the toothed wheel has been shaped from the blank, and disengaging the master gears from the toothed wheel by radially displacing the master gears relative to the center of the toothed wheel.

2. In an apparatus for producing a toothed wheel comprising a plurality of master gears each rotatably mounted with its outer periphery lying on the circumference of a common circle, said common circle being adapted to receive a blank of material having sides, a top face and a bottom face so that the master gears engage the sides of the blank, rolling means disposed adjacent the top and bottom faces of the blank and adapted to be brought into engagement with said top and bottom faces to vertically compress the blank, means to rotate the master gears relative to the blank, and means to displace the master gears radially with respect to the center of the blank.

3. An apparatus improvement according to claim 2 wherein the means to displace the master gears comprises, in combination, a first frame, a plurality of bearing means each mounting one of said master gears and each being mounted on said first frame so as to be radially displaceable to varying distances from the center of the circle, a pin vertically mounted on each bearing means, a second frame which is rotatable about the center of the circle and which has a plurality of arcuate slots, each of said slots slidingly accommodating one of said pins and the ends of each of said slots being displaced from one another both circumferentially with respect to the circumference of the circle and radially with respect to the center of the circle.

4. An apparatus improvement according to claim 3, wherein a plurality of radial grooves is disposed through the first support, the number of said grooves corresponding to the number of said bearing means and each of said bearing means is provided with a tongue which slidingly engages one of said grooves for radial displacement therein relative to the center of said circle.

References Cited by the Examiner

UNITED STATES PATENTS

| | | | |
|---|---|---|---|
| 983,042 | 1/1911 | Girlot | 80—16.3 |
| 1,068,236 | 7/1913 | Girlot | 80—16.3 |
| 1,558,086 | 10/1925 | Gustavsen | 80—16.3 |
| 2,132,370 | 10/1938 | Hubbard | 80—5 |
| 2,280,783 | 4/1942 | Bell et al. | 80—5 |
| 2,679,089 | 5/1954 | Opitz | 80—16.3 |
| 2,776,585 | 1/1957 | Kendall | 80—5 |
| 2,934,980 | 5/1960 | Grob | 80—16.3 |

FOREIGN PATENTS 216,314   7/1961   Austria.

CHARLES W. LANHAM, *Primary Examiner.*

H. D. HOINKES, *Assistant Examiner.*